March 16, 1948.  J. W. MacFARLAND, JR  2,437,700

AIRCRAFT

Filed May 21, 1945

Inventor
Jay William MacFarland, Jr.

By Ralph L Chappell

Attorney

Patented Mar. 16, 1948

2,437,700

UNITED STATES PATENT OFFICE 2,437,700

AIRCRAFT

Jay William MacFarland, Jr., United States Navy

Application May 21, 1945, Serial No. 594,883

2 Claims. (Cl. 170—135.5)

(Granted under the act of March 3, 1883, as amended April 30, 1928; 370 O. G. 757)

The present invention relates to new and useful improvements in aircraft, and more particularly to improvements in aircraft propelling means.

In general, the invention contemplates the provision of driving means for a rotary impeller, and more particularly to driving means for the rotary wing or blade of a helicopter. The driving means may be any suitable type of reaction motor, such as a jet propulsion unit of the Athodyd or other type. It has been proposed to rotate the blades of a helicopter by mounting jet propulsion units at or near the tips of the blades. However, the reaction forces incident to operation of the motor units are exceptionally high, and often too great for conventional blade structures to withstand. This is particularly true in initiating rotation of the blade. Furthermore, with such constructions, it is difficult to obtain optimum efficiency for both the rotor blades and the motor units since the usual rotor blade tip speed is of the order of 500 feet per second whereas the motor units operate most efficiently at speeds of 800 feet per second and above.

With the above in mind, one of the principal objects of the invention is to provide an arrangement permitting differential rotation between the rotor blades and the reaction units whereby each may operate at optimum efficiency.

Another object of the present invention is to effect driving of a rotary impeller by reaction motor means without subjecting the impeller to overloads incident to operation of the reaction motor means.

A further object of the invention is to mount the reaction motor units independently of the impeller for movement relative thereto and coaxially therewith.

The invention still further aims to provide a device of the above type which is extremely simple in construction and efficient in operation, and wherein suitable power transmitting means is employed for connecting the reaction motor means with the rotary impeller.

The above and other objects of the invention will in part be obvious and will be hereinafter more fully pointed out.

In the accompanying drawings.

Figure 1:
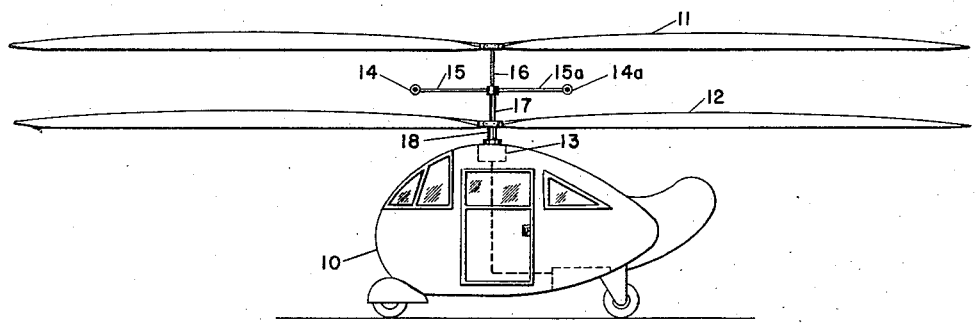
Figure 2:
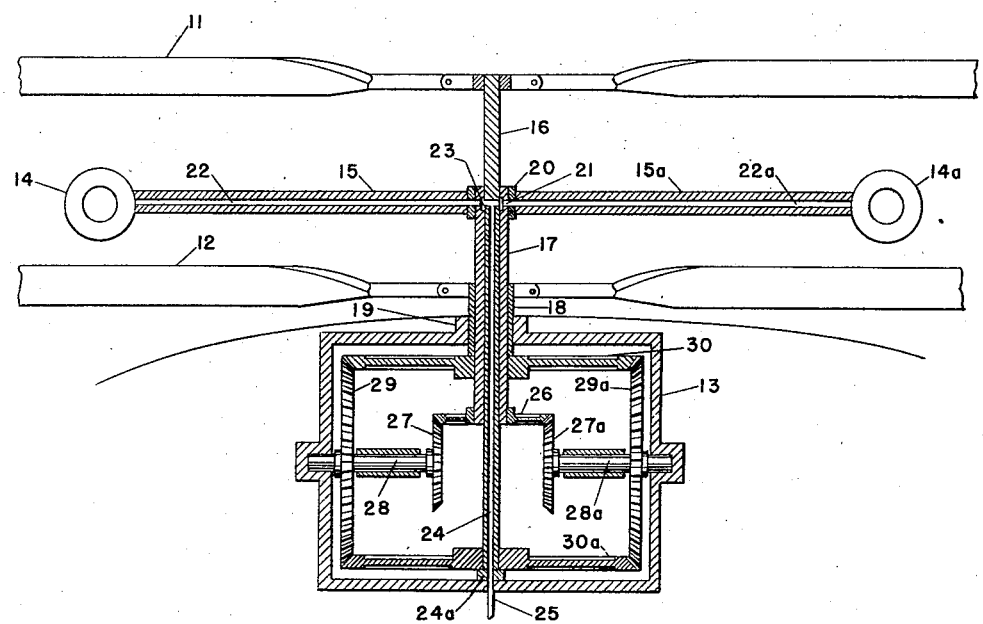

Fig. 1 is a diagrammatic side elevation showing a helicopter with counter-rotating blades; and Fig. 2 is an enlarged sectional view taken substantially along the line 2—2 of Fig. 1, and showing the driving shafts and reduction gearing within the gear housing.

Referring more in detail to the accompanying drawings, and particularly to Fig. 1 thereof, the invention is illustrated in connection with a helicopter having a fuselage forming a cab 10 and counter-rotating upper and lower blades 11, 12 respectively. Within the cab, a gear housing 13 is secured at the upper surface thereof and is adapted to enclose suitable reduction gearing which will be hereinafter described. The reaction motors 14, 14a are mounted at opposite ends of arms 15, 15a which are disposed between the rotary blades and which are mounted for rotation coaxially therewith. The motor units are mounted so as to direct a thrust normal to the arms 15, 15a and in the plane of rotation thereof. The arms 15, 15a are relatively short as compared with the blades and may be of relatively heavy construction to withstand reaction forces when the motor units are in operation. The arms may also be shaped to provide a low drag, high speed air foil so as to give some additional lift to the aircraft and to also improve the air flow over the center portions of the blades.

The driving mechanism and connections for the rotary blades will now be described, reference being had to Fig. 2 of the accompanying drawings. Inner, intermediate and outer tubular shafts 16, 17, 18 respectively, extend through a suitable form of bearing or bushing 19 in the upper surface of the gear housing. The inner driven shaft 16 carries the upper rotor blade 11 and the lower end of the shaft contacts an apertured bearing member. The driven shaft 18 carries the lower rotor blade 12. The intermediate driving shaft carries the arms 15, 15a which are secured thereto by a collar 20 having apertures 21 therethrough communicating with passages 22, 22a through the arms 15, 15a respectively. These apertures also communicate with an annular chamber 23 in the intermediate shaft. The annular chamber 23 is in communication with the longitudinal passage 24 provided in the inner shaft. This passage is in communication through the apertured bearing and sealing member 24a with a conduit 25 which leads to a fuel tank (not shown).

Within the gear housing 13, the intermediate shaft 17 carries a bevel gear 26 which is in mesh with opposed gears 27, 27a carried by horizontally disposed stub shafts 28, 28a respectively, which are suitably mounted within the gear housing 13. The stub shafts also carry additional larger bevel gears 29, 29a which are in mesh with opposed horizontally disposed bevel gears 30, 30a. Thus, rotation of the intermediate shaft 17 will effect rotation of the bevel gear 26 which in turn will effect rotation of the bevel gears 27, 27a and 29, 29a in opposite directions. Similarly, the bevel gears 30, 30a will be rotated in opposite directions and at a substantially reduced rate of speed. The bevel gear 30 is secured to the outer shaft 18 for driving the lower rotor blade 12 in one direction and the bevel gear 30a is secured to the inner shaft 16 for driving the upper rotor blade 11 in the opposite direction.

Thus, the gearing is selected according to proper ratios which will result in the desired relative speeds of the reaction units and the blades to obtain optimum efficiency.

The longitudinal passages 22, 22a lead from the annular chamber 23 outwardly to the reaction motor units 14, 14a respectively. After the initial starting of the jet or other reaction units, the arm 15 will be rapidly rotated and the blades will also be rotated but at a slower speed by reason of the reduction gear train in the housing 13. If desired, any suitable type of clutch mechanism (not shown) may be provided to effect engagement and disengagement of the gearing with respect to the driven shafts. Also, centrifugal force of the rotating arm 15 may be employed, without additional force feeding means, to effect drawing the fuel through the passage within the inner shaft 16, and thence, outwardly through the fuel passages 22, 22a. It is, of course, obvious that a single rotor blade may be employed, if desired.

While one form of the invention has been shown for purposes of illustration, it is to be clearly understood that various changes in the details of construction and arrangement of parts may be made without departing from the scope of the invention as set forth in the appended claims.

The invention described herein may be manufactured and use by or for the Government of the United States of America for governmental purposes without the payment of any royalties thereon or therefor.

What is claimed is:

1. In aircraft having a rotary wing, the combination of at least one reaction motor unit mounted on an arm, a hollow arbor supporting said arm, means for supplying fuel to said motor through the said arm and arbor, a gear box, means within the gear box for rotatably supporting said arbor, a beveled driving gear attached to said arbor, two diametrically opposed intermediate beveled gears engaged with said driving gear, two shafts rotatably supported within the gear box attached one to each of said intermediate gears, two other intermediate beveled gears attached one to each of the shafts, two diametrically opposed driven gears engaged with the second intermediate gears, two axially concentric driven shafts attached one to each of the driven gears, means for mounting said concentric shafts in the gear box concentrically on said arbor, and rotary wings radially supported on said shafts whereby rotation of the arm supporting the reaction motor unit causes the wings to rotate in opposite directions with equal strains and torsions on the gears and shafts.

2. In aircraft having rotary wings, the combination of at least one reaction motor unit mounted on an arm, a hollow arbor supporting said arm, means for supplying fuel to the reaction motor unit through said arm and arbor, a gear box mounted on the aircraft, means within the gear box for supporting said arbor, a beveled driving gear attached to said arbor, two diametrically opposed intermediate beveled gears engaged with said driving gear, two shafts rotatably supported within said gear box attached one to each of the intermediate gears, two other intermediate beveled gears attached one to each of the shafts, two diametrically opposed driven beveled gears larger in diameter than the driving gear engaged with the second intermediate gears, two axially concentric driven shafts attached one to each of the driven gears, means for mounting said concentric shafts in the gear box concentrically on said arbor, and rotary wings supported radially on said shafts whereby rotation of the arm supporting the reaction motor unit causes the wings to rotate in opposite directions at angular speeds less than the angular speed of the reaction motor unit.

JAY WILLIAM MacFARLAND, JR.

REFERENCES CITED

The following references are of record in the file of this patent:

UNITED STATES PATENTS

| Number | Name | Date |
|---|---|---|
| 280,595 | Fernie | July 3, 1883 |
| 1,001,956 | Holson | Aug. 29, 1911 |
| 1,569,607 | Beck | Jan. 12, 1926 |
| 2,064,195 | DeMichelis | Dec. 15, 1936 |
| 2,085,483 | Trebucien | June 29, 1937 |
| 2,148,313 | Williams | Feb. 21, 1939 |
| 2,356,746 | Boushey | Aug. 29, 1944 |

FOREIGN PATENTS

| Number | Country | Date |
|---|---|---|
| 159,223 | Great Britain | Aug. 21, 1922 |
| 375,975 | France | July 27, 1907 |
| 427,217 | France | May 22, 1911 |